(12) United States Patent
Tedaldi et al.

(10) Patent No.: US 11,971,962 B2
(45) Date of Patent: Apr. 30, 2024

(54) LEARNING AND ASSESSING DEVICE CLASSIFICATION RULES

(71) Applicant: Cisco Technology, Inc., San Jose, CA (US)

(72) Inventors: David Tedaldi, Zurich (CH); Grégory Mermoud, Veyras (CH); Jürg Nicolaus Diemand, Pfäffikon (CH); Jean-Philippe Vasseur, Saint Martin d'Uriage (FR); Pierre-André Savalle, Rueil-Malmaison (FR)

(73) Assignee: Cisco Technology, Inc., San Jose, CA (US)

( * ) Notice: Subject to any disclaimer, the term of this patent is extended or adjusted under 35 U.S.C. 154(b) by 392 days.

(21) Appl. No.: 16/860,581

(22) Filed: Apr. 28, 2020

(65) Prior Publication Data

US 2021/0335505 A1    Oct. 28, 2021

(51) Int. Cl.
*G16Y 40/35* (2020.01)
*G06F 3/0482* (2013.01)
(Continued)

(52) U.S. Cl.
CPC .......... *G06F 18/251* (2023.01); *G06F 3/0482* (2013.01); *G06F 18/22* (2023.01); *G06F 18/24323* (2023.01); *G06F 18/254* (2023.01); *G06N 5/025* (2013.01); *G16Y 40/35* (2020.01); *H04L 41/12* (2013.01); *H04L 41/22* (2013.01)

(58) Field of Classification Search
CPC .... G16Y 40/35; G06F 3/0482; G06K 9/6215; G06K 9/6282; G06K 9/6292
See application file for complete search history.

(56) References Cited

U.S. PATENT DOCUMENTS 8,724,911 B2 * 5/2014 Saund ................. G06V 30/412
 707/729
9,348,899 B2 * 5/2016 Simard .................. G06F 16/35
(Continued)

FOREIGN PATENT DOCUMENTS

WO      WO-16026509 A1    2/2016
WO      WO-16043846 A2    3/2016

OTHER PUBLICATIONS

Bisson, et al., "X-Sim: A New Similarity Measure for the Co-Clustering Task", 2008 Seventh International Conference on Machine Learning and Applications, Dec. 2008, pp. 211-217, IEEE.
(Continued)

*Primary Examiner* — Ario Etienne
*Assistant Examiner* — Kidest Mendaye
(74) *Attorney, Agent, or Firm* — BEHMKE INNOVATION GROUP LLC; James M. Behmke; James J. Wong

(57) ABSTRACT

In various embodiments, a device obtains a set of device classification rules. Each device classification rule specifies one or more attributes from a set of attributes and being configured to assign a device type to an endpoint in a network when the endpoint exhibits the one or more attributes specified by that rule. The device forms a graphical representation of the set of attributes. The device performs an analysis of the graphical representation of the set of attributes. The device provides a result of the analysis to a user interface.

18 Claims, 11 Drawing Sheets

(51) Int. Cl.
*G06F 18/22* (2023.01)
*G06F 18/243* (2023.01)
*G06F 18/25* (2023.01)
*G06N 5/025* (2023.01)
*H04L 41/12* (2022.01)
*H04L 41/22* (2022.01)

(56) References Cited

U.S. PATENT DOCUMENTS

| | | | | |
|---|---|---|---|---|
| 9,836,183 | B1* | 12/2017 | Love | G06F 16/904 |
| 10,038,697 | B2 | 7/2018 | Dotan et al. | |
| 10,218,726 | B2 | 2/2019 | Vasseur et al. | |
| 10,958,529 | B2* | 3/2021 | Xia | H04L 41/142 |
| 2015/0293992 | A1* | 10/2015 | Meehan | G06F 17/18 |
| | | | | 707/740 |
| 2016/0335260 | A1* | 11/2016 | Convertino | G06F 16/2358 |
| 2016/0337211 | A1* | 11/2016 | Singh | H04L 43/067 |
| 2017/0316318 | A1* | 11/2017 | O'Brien | G06N 5/04 |
| 2018/0013681 | A1* | 1/2018 | Kohout | H04L 63/1425 |
| 2018/0227176 | A1* | 8/2018 | Ponnuswamy | H04L 41/142 |
| 2018/0270229 | A1* | 9/2018 | Zhang | H04L 69/22 |
| 2018/0336459 | A1 | 11/2018 | Baughman et al. | |
| 2019/0081852 | A1* | 3/2019 | Nazar | H04L 41/0695 |
| 2019/0306731 | A1* | 10/2019 | Raghuramu | H04L 63/102 |
| 2020/0044940 | A1* | 2/2020 | Thomasson | H04L 41/085 |
| 2021/0264025 | A1* | 8/2021 | Givental | G06F 21/577 |
| 2022/0086071 | A1* | 3/2022 | Sivaraman | H04L 63/1425 |

OTHER PUBLICATIONS

Gärdenfors, Peter, "How to Make the Semantic Web More Semantic", Formal Ontology in Information Systems, 2004, 19-36, IOS Press.

Hartigan, J.A., "Direct Clustering of a Data Matrix", Journal of the American Statistical Association, vol. 67, No. 337, Mar. 1972, pp. 123-129.

Pontes, et al., "Biclustering on Expression Data: A Review", Journal of Biomedical Informatics, Jul. 2015, pp. 163-180, Elsevier Inc.

Priss, Uta, "Linguistic Applications of Formal Concept Analysis", in Ganter B., Stumme G., Wille R. (eds), Formal Concept Analysis, Foundations and Applications, Lecture Notes in Computer Science, 2005, pp. 149-160, Springer Verlag.

Snelting, et al., "Reengineering Class Hierarchies Using Concept Analysis", SIGSOFT, Nov. 1998, ACM.

Wolff, Karl Erich, "A First Course in Formal Concept Analysis: How to Understand Line Diagrams", in: Faulbaum, F. (ed) SoftStat'93, Advances in Statistical Software 4, pp. 429-438.

"Formal Concept Analysis", online: https://en.wikipedia.org/wiki/Formal_concept_analysis, Apr. 2020, 12 pages, Wikimedia Foundation, Inc.

* cited by examiner

LEARNING AND ASSESSING DEVICE CLASSIFICATION RULES

TECHNICAL FIELD

The present disclosure relates generally to computer networks, and, more particularly, to learning and assessing device classification rules.

BACKGROUND

An emerging area of interest in the field of computer networking is the "Internet of Things" (IoT), which may be used by those in the art to refer to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, window shades and blinds, doors, locks, etc.

As more non-traditional devices join the IoT, networks may eventually evolve from a bring-your-own-device (BYOD) model to a model that enables bring-your-own-thing (BYOT), bring-your-own-interface (BYOI), and/or bring-your-own-service (BYOS) paradigms. In other words, as the IoT grows, the number of available services, etc., will also grow considerably. For example, a single person in the future may transport sensor-equipped clothing, other portable electronic devices (e.g., cell phones, etc.), cameras, pedometers, or the like, into an enterprise environment, each of which may attempt to access the wealth of new IoT services that are available on the network.

From a networking perspective, the network can automatically configure access control policies, other security policies, and the like, if the device type of a particular device is known to the network. For example, the network may limit a particular type of sensor to only communicating with its supervisory device. Typically, this classification is made by observing the behavior of the device during a short period of time after joining the network (e.g., the first minute) and applying a device classification rule to the observed behavior. However, the level of complexity involved in generating and maintaining device classification rules can often lead to inaccurate rules, which could present a security risk to the network, as well as the potential for rules to conflict.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
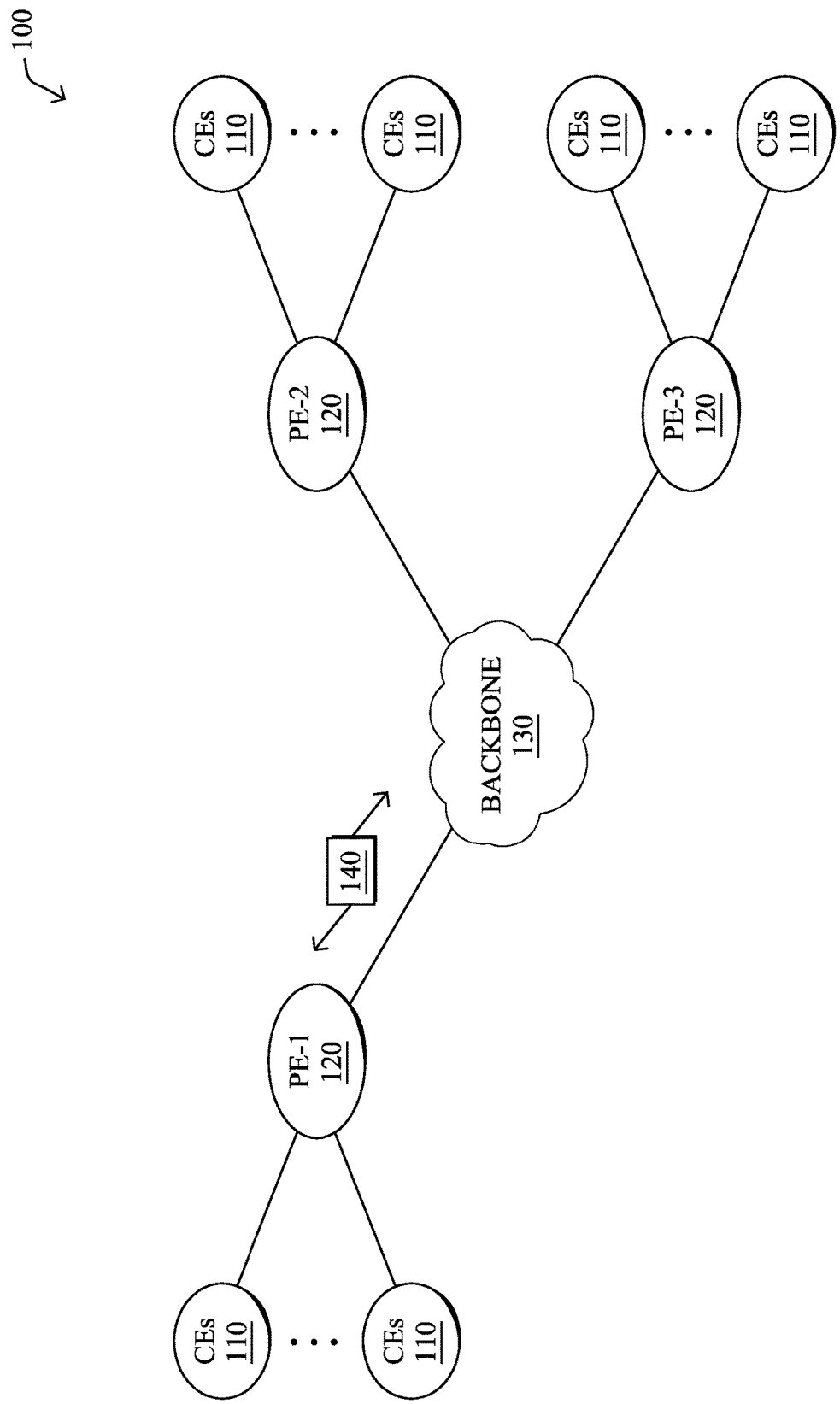
FIGS. 1A-1B illustrate an example communication network.

According to one or more embodiments of the disclosure, a device obtains a set of device classification rules. Each device classification rule specifies one or more attributes from a set of attributes and being configured to assign a device type to an endpoint in a network when the endpoint exhibits the one or more attributes specified by that rule. The device forms a graphical representation of the set of attributes. The device performs an analysis of the graphical representation of the set of attributes. The device provides a result of the analysis to a user interface.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may further be interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless networks. That is, in addition to one or more sensors, each sensor device (node) in a sensor network may generally be equipped with a radio transceiver or other communication port, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN, thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different service providers), with potentially a backup link (e.g., a 3G/4G/5G/LTE connection). A site of type B may itself be of different types:

2a.) Site Type B1: a site connected to the network using two MPLS VPN links (e.g., from different service providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
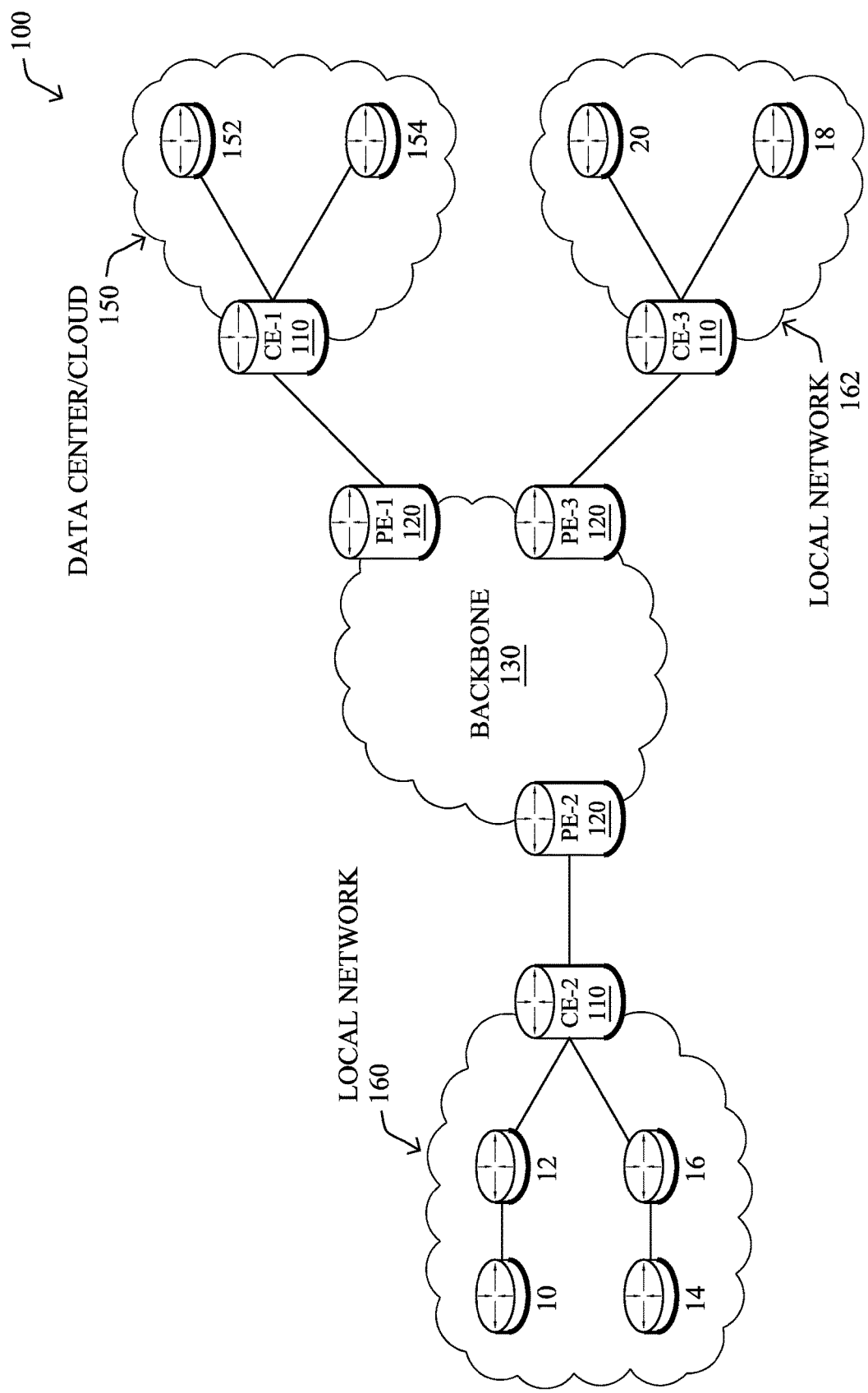

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

The techniques herein may also be applied to other network topologies and configurations. For example, the techniques herein may be applied to peering points with high-speed links, data centers, etc. Further, in various embodiments, network 100 may include one or more mesh networks, such as an Internet of Things network. Loosely, the term "Internet of Things" or "IoT" refers to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, etc., are often on what is referred to as Low-Power and Lossy Networks (LLNs), which are a class of network in which both the routers and their interconnect are constrained. In particular, LLN routers typically operate with highly constrained resources, e.g., processing power, memory, and/or energy (battery), and their interconnections are characterized by, illustratively, high loss rates, low data rates, and/or instability. LLNs are comprised of anything from a few dozen to thousands or even millions of LLN routers, and support point-to-point traffic (e.g., between devices inside the LLN), point-to-multipoint traffic (e.g., from a central control point such at the root node to a subset of devices inside the LLN), and multipoint-to-point traffic (e.g., from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

Figure 2:
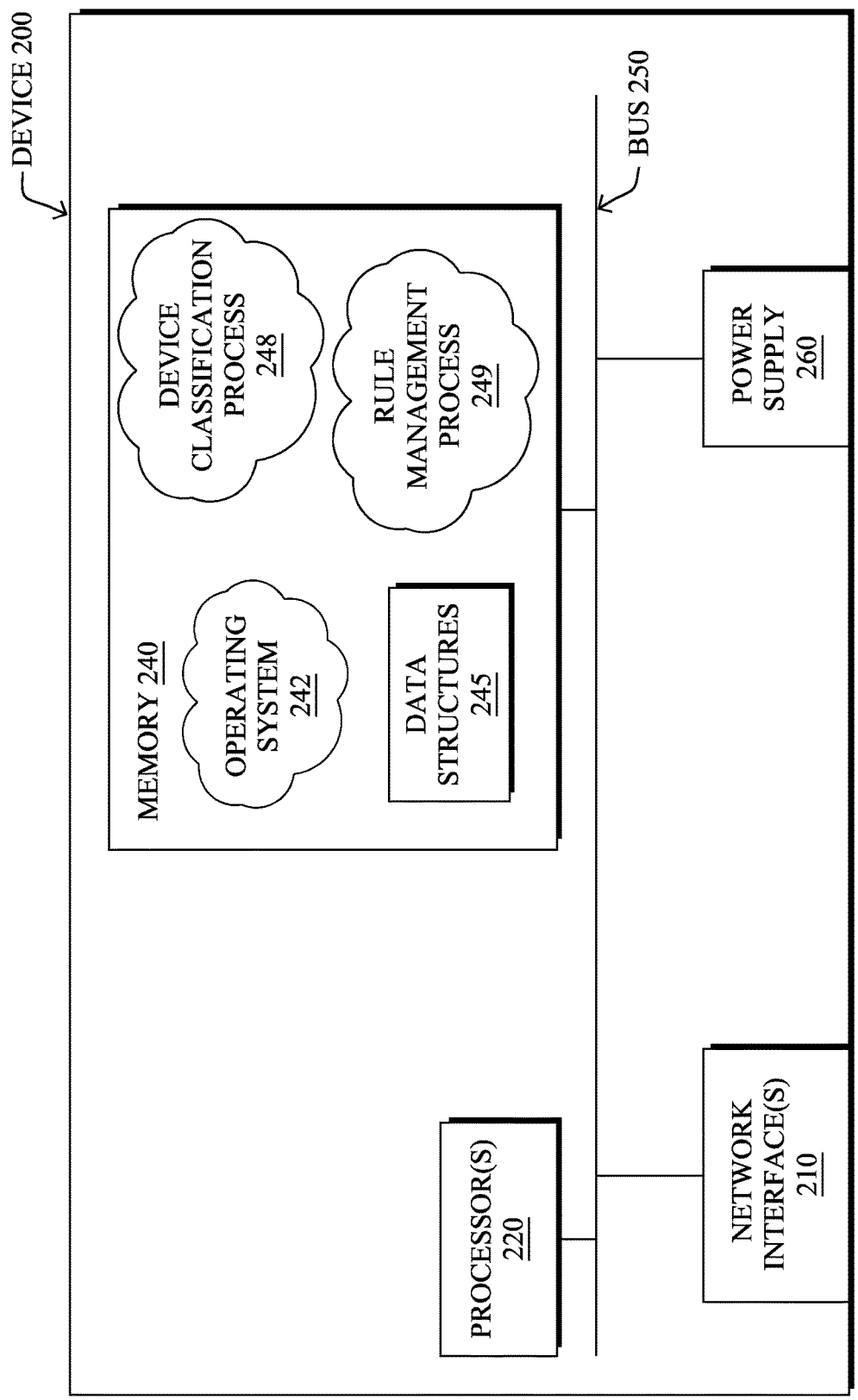
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a device classification process 248 and/or a rule management process 249, as detailed below.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, device classification process 248 may execute one or more machine learning-based classifiers to classify an endpoint device in a network, based on its corresponding network traffic. In one embodiment, device classification process 248 may assess captured telemetry data regarding one or more traffic flows involving the device, to determine the device type associated with the endpoint device. In other words, the captured telemetry data is indicative of the attributes of the endpoint (e.g., behavioral characteristics, such as the protocols that it uses, etc.), which is then evaluated by device classification process 248 to assign a device type to the endpoint device (e.g., an "iPhone," an "Android device," etc.).

Device classification process 248 may employ any number of machine learning techniques, to classify the gathered telemetry data and apply a device type label to a device associated with the traffic. In general, machine learning is concerned with the design and the development of techniques that receive empirical data as input (e.g., telemetry data regarding traffic in the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a,b,c such that the number of misclassified points is minimal. After this optimization/learning phase, device classification process 248 can use the model M to classify new data points, such as information regarding new traffic flows in the network. Often, M is a statistical model, and the cost function is inversely proportional to the likelihood of M, given the input data.

In various embodiments, device classification process 248 may employ one or more supervised, unsupervised, or semi-supervised machine learning models. Generally, supervised learning entails the use of a training set of data, as noted above, that is used to train the model to apply labels to the input data. For example, the training data may include sample telemetry data that is labeled as "iPhone 6," or "iOS 10.2." On the other end of the spectrum are unsupervised techniques that do not require a training set of labels. Notably, while a supervised learning model may look for previously seen patterns that have been labeled as such, an unsupervised model may attempt to analyze the data without applying a label to it. For example, supervised learning can be used to cluster devices that behave similarly to one another, based on their captured telemetry data. Semi-supervised learning models take a middle ground approach that uses a greatly reduced set of labeled training data.

Example machine learning techniques that device classification process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of traffic flows that are incorrectly classified as associated with a particular device type (e.g., make and/or model number, operating system, etc.). Conversely, the false negatives of the model may refer to the number of traffic flows that the model incorrectly classifies as belonging to a certain device type. True negatives and positives may refer to the number of traffic flows that the model correctly classifies as not being of a certain class or being of a certain class, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

In some cases, device classification process 248 may assess the captured telemetry data on a per-flow basis. In other embodiments, device classification process 248 may assess telemetry data for a plurality of traffic flows based on any number of different conditions. For example, traffic flows may be grouped based on their sources, destinations, temporal attributes (e.g., flows that occur around the same time or within the same time window, etc.), combinations thereof, or based on any other set of flow attributes.

Figure 3:
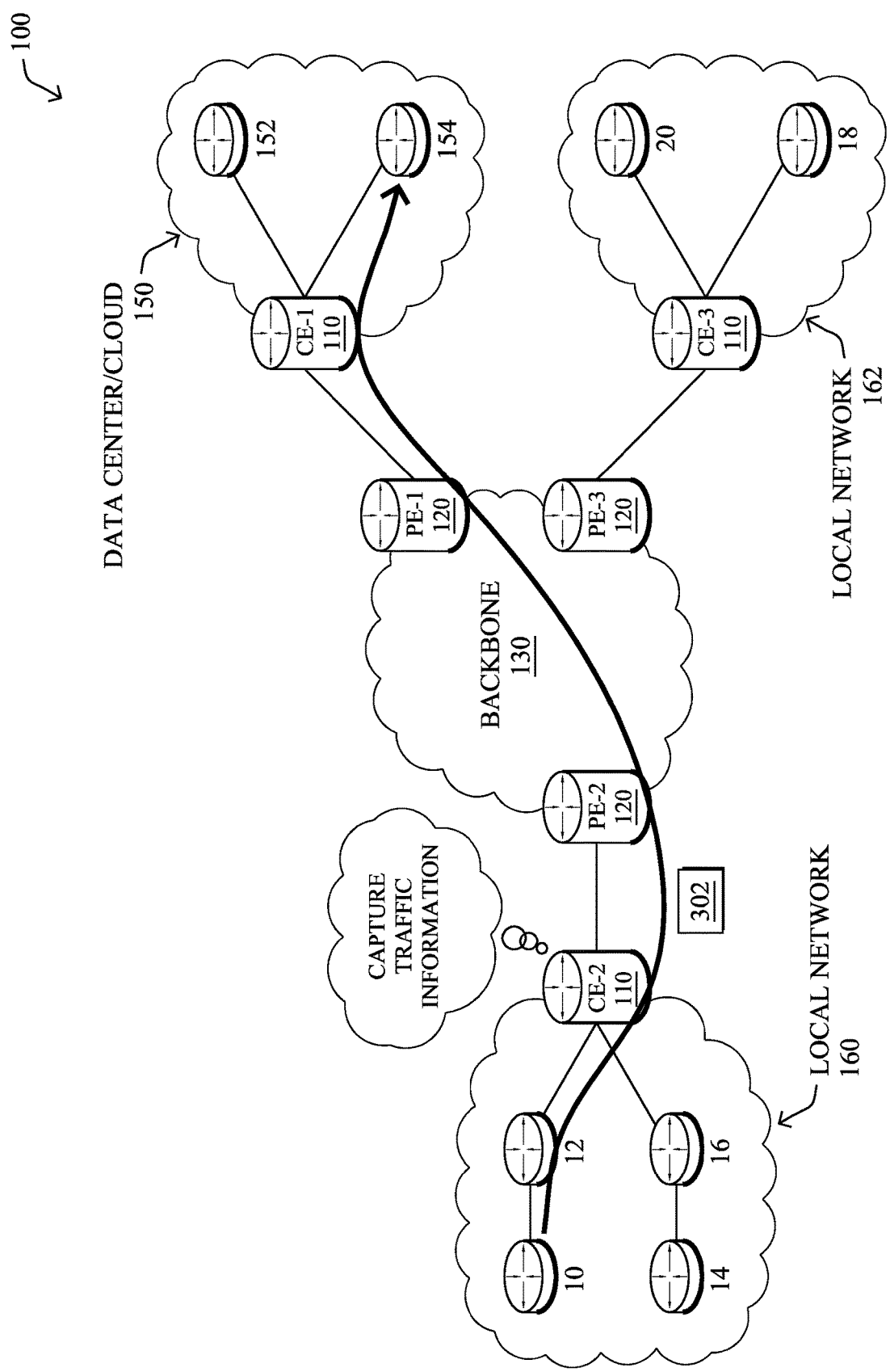
FIG. 3 illustrates an example of the capture of traffic telemetry data.

As shown in FIG. 3, various mechanisms can be leveraged to capture information about traffic in a network, such as telemetry data regarding a traffic flow. For example, consider the case in which client node 10 initiates a traffic flow with remote server 154 that includes any number of packets 302. Any number of networking devices along the path of the flow may analyze and assess packet 302, to capture telemetry data regarding the traffic flow. For example, as shown, consider the case of edge router CE-2 through which the traffic between node 10 and server 154 flows.

In some embodiments, a networking device may analyze packet headers, to capture telemetry data about the traffic flow. For example, router CE-2 may capture the source address and/or port of host node 10, the destination address and/or port of server 154, the protocol(s) used by packet 302, the hostname of server 154, and/or other header information by analyzing the header of a packet 302. Example features in the captured telemetry data may include, but are not limited to, Transport Layer Security (TLS) information (e.g., from a TLS handshake), such as the ciphersuite offered, User Agent information, destination hostname, TLS extensions, etc., HTTP information (e.g., URI, etc.), Domain Name System (DNS) information, ApplicationID, virtual LAN (VLAN) ID, or any other data features that can be extracted from the observed traffic flow(s). Further information, if available could also include process hash information from the process on host node 10 that participates in the traffic flow.

In further embodiments, the device may also assess the payload of the packet to capture information about the traffic flow. For example, router CE-2 or another device may perform deep packet inspection (DPI) on one or more of packets 302, to assess the contents of the packet. Doing so may, for example, yield additional information that can be used to determine the application associated with the traffic flow (e.g., packets 302 were sent by a web browser of node 10, packets 302 were sent by a videoconferencing application, etc.).

The networking device that captures the flow telemetry data may also compute any number of statistics or metrics regarding the traffic flow. For example, CE-2 may determine the start time, end time, duration, packet size(s), the distribution of bytes within a flow, etc., associated with the traffic flow by observing packets 302.

As noted above, with the proliferation of IoT devices and the bring-your-own-device (BYOD) approach, it is very difficult for an administrator to provide detailed information about each device connected to the network, such as its device type (e.g., printer, iPhone, tablet, iOS 10 device, etc.). Because of the dynamic nature of modern networks, this type of information is not static and cannot be handled manually. However, such detailed information may be needed for proper assessment of security incidents involving a particular device, to apply a network access policy to the device, for purposes of traffic shaping of traffic involving the device, and other network operations.

Figure 4:
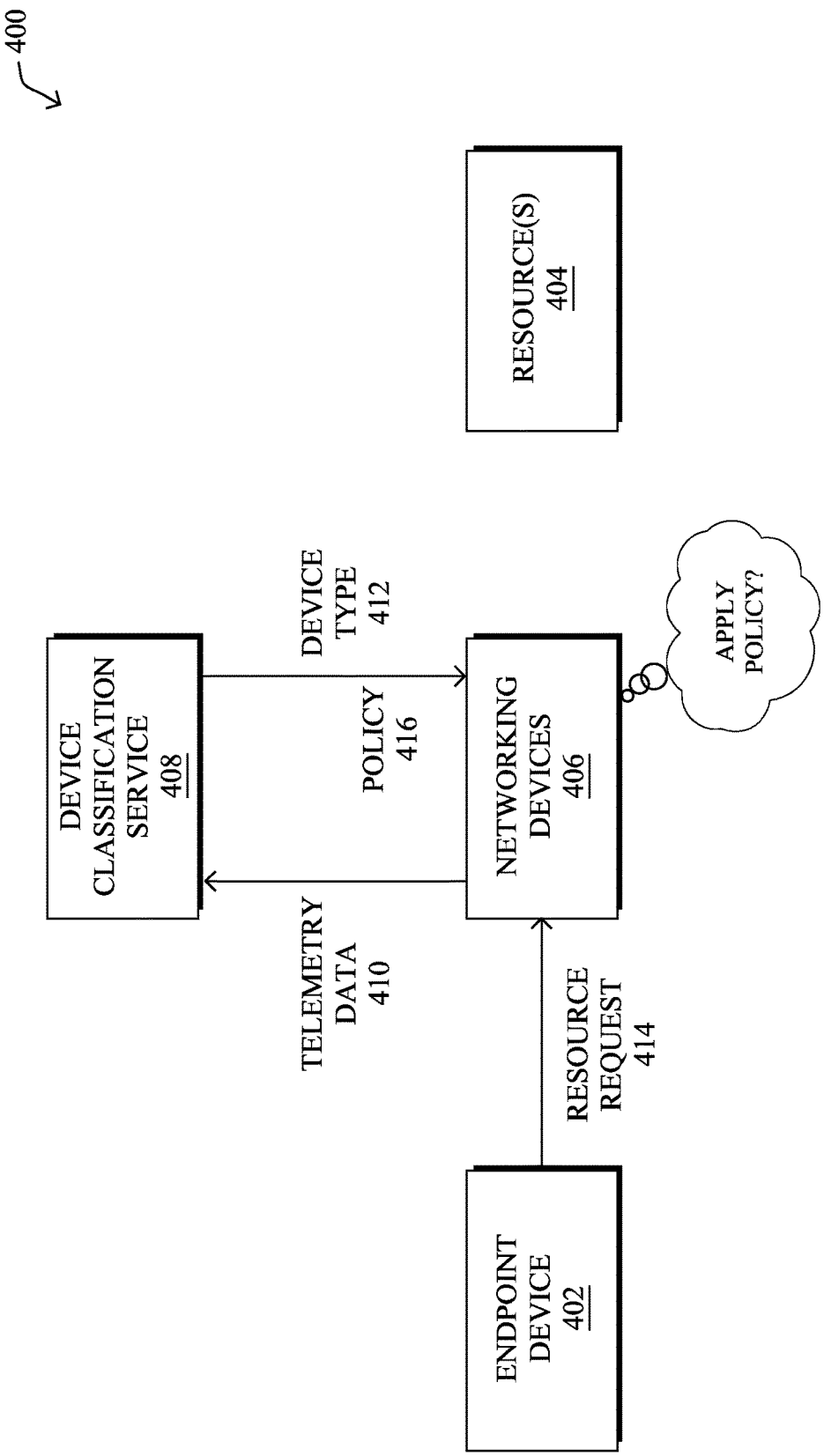
FIG. 4 illustrates an example of a device classification service in a network.

FIG. 4 illustrates an example of a device classification service in a network, in various embodiments. As shown, network 400 may generally include an endpoint device 402 (e.g., a user device, a sensor, an actuator, etc.), any number of resources 404, and any number of networking devices 406 that are configured to provide connectivity between endpoint device 402 and resource(s) 404. For example, networking devices 406 may include access points, wireless LAN controllers (WLCs), switches, routers, security devices (e.g., firewalls, etc.), access points (APs), and the like. Network resources 404 may include cloud-based services, specific servers or other endpoints, webpages, or any other resource with which endpoint device 402 could communicate.

Also as shown in FIG. 4 is a device classification service 408 that may be hosted on one or more of networking devices 406 or be in communication therewith. Service 408 may, for example, be provided through the execution of device classification process 248, described above. In general, device classification service 408 is configured to take as input telemetry data 410 captured by networking device 406 regarding network traffic associated with endpoint device 402 and, based on the captured telemetry, identify the device type 412 of endpoint device 402. For example, device type 412 may indicate the operating system (e.g., iOS, Android, etc.), manufacturer (e.g., Apple, Samsung, etc.), make (e.g., iPhone, etc.), model/version (e.g., 5s, 6, 7, etc.), function (e.g., thermostat, temperature sensor, etc.), or any other information that can be used to categorize endpoint device 402.

Note that the classification of endpoint device 402 by device classification service 408 can also, in some embodiments, be of varying specificity, depending on the telemetry data 410 available to service 408 and/or its degree of confidence in a particular classification. For example, device classification service 408 may determine, with a high degree of confidence, that endpoint device 402 is an Apple iPhone, but may or may not be able to determine whether device 402 is an iPhone 5s or an iPhone 6. Accordingly, in some embodiments, service 408 may also return the confidence values for the classification label(s) in device type 412 to networking device 406.

The labeling of endpoint device 402 with a device type 412 by device classification service 408 may initiate enforcement of one or more network policies by networking device 406 with respect to endpoint device 402. Such network policies may include, but are not limited to, security policies, network traffic or quality of service (QoS) policies, access polices, and the like. For example, as shown, assume that endpoint device 402 sends out a resource request 414 for a particular one of resources 404. In turn, networking devices 406 may determine whether to allow or block resource request 414 from reaching its target resource 404, based on the policy 416 associated with the determined device type 412 of endpoint device 402. For example, if endpoint device 402 is determined to be a smart thermostat, it may be prevented from accessing certain online resources, such as an email service. Similarly, if endpoint device 402 is determined to be a safety-related sensor, a traffic or QoS policy associated with device type 412 may cause networking devices 406 to assign a higher priority to traffic from endpoint device 402.

In general, device classification (also known as "device profiling") to identify the device type of a device under scrutiny has traditionally used static rules and heuristics for the determination. In further embodiments, the device classification can be achieved by applying a trained machine learning-based classifier to the captured telemetry data for an endpoint device. Such telemetry can also take the form of information captured through active and/or passive probing of endpoint devices, to assign a device type and corresponding host profile to a device. Notably, this probing may entail sending any or all of the following probes:

DHCP probes with helper addresses
SPAN probes, to get messages in INIT-REBOOT and SELECTING states, use of ARP cache for IP/MAC binding, etc.
Netflow probes
HTTP probes to obtain information such as the OS of the device, Web browser information, etc.
RADIUS probes
SNMP to retrieve MIB object or receives traps
DNS probes to get the Fully Qualified Domain Name (FQDN)
etc.

A device classification service may even trigger active scanning of the network and SNMP scanning when the default community string is set to public. This can be done, for example, to retrieve the MAC address of the device or other types of information. Such a variety to probes allows for the gathering of a rich set of information that can be used for device profiling. A degree of confidence can also be assigned to any such device type classifications. Note also that the device profiling can be performed at multiple points in the network, such as by wireless LAN controllers (WLCs) in addition to, or in lieu of, a centralized service.

Figure 5:
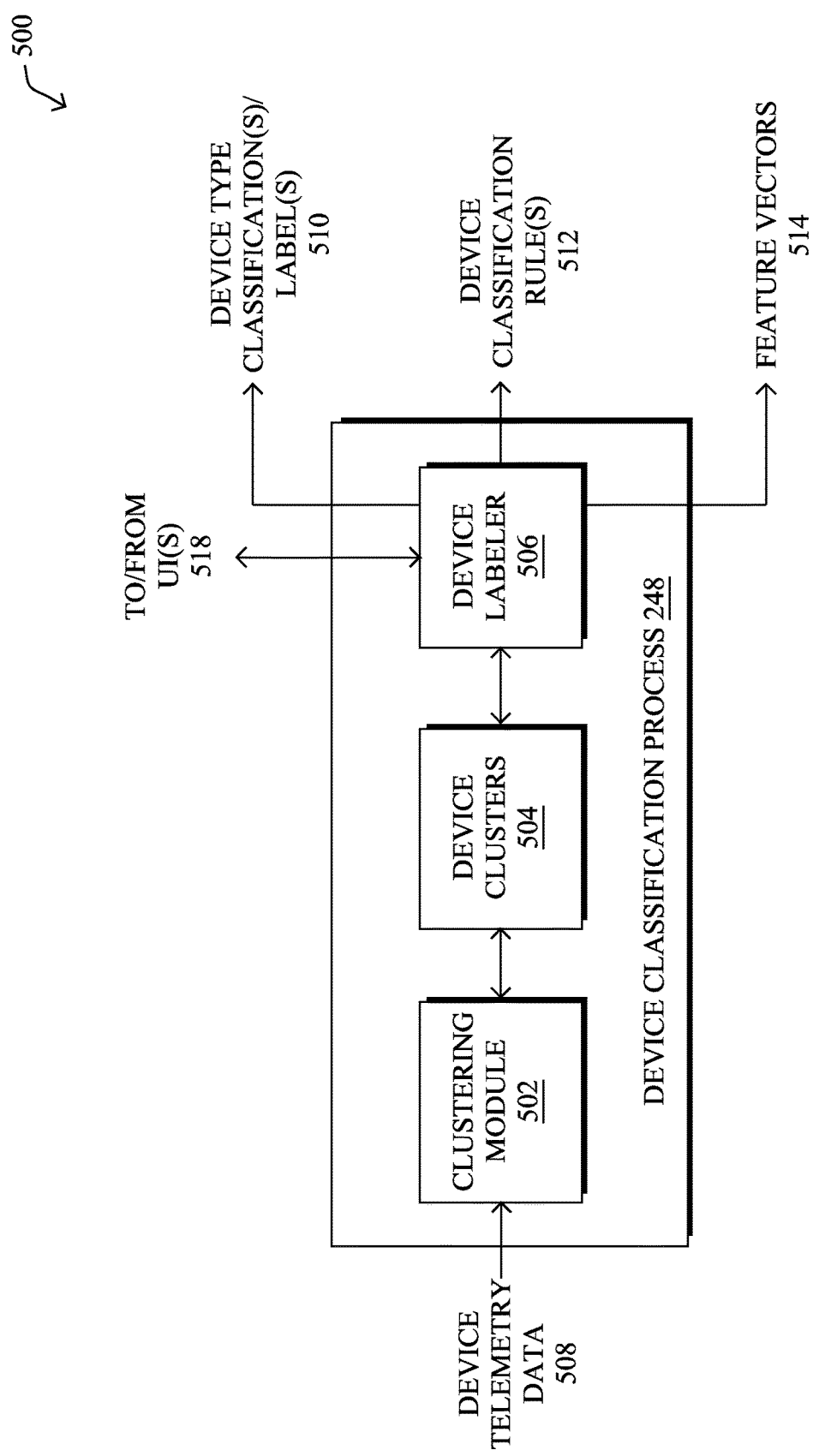
FIG. 5 illustrates an example architecture for a device classification process.

FIG. 5 illustrates an example architecture 500 for device classification process 248, according to various embodiments. As shown, device classification process 248 may include any or all of the following components: clustering module 502, device clusters 504, and/or a device labeler 506, to provide a device classification service to one or more networks. These components 502-506 may be implemented in a distributed manner or implemented on a single device. In addition, some or all of components 502-506 may be implemented as part of a monitored network (e.g., at the network edge) or part of a cloud-based device classification service. For example, in some implementations, a cloud-based device classification service may perform centralized rule generation for any number of networks that perform the classifications locally. The functionalities of the components of architecture 500 may also be combined, omitted, or implemented as part of other processes, as desired.

As shown, device classification process 248 may receive device telemetry data 508 regarding any number of devices undergoing device type classification. Such device telemetry data 508 may include, for example, the MAC addresses of the devices, traffic features captured from the devices' traffic (e.g., which protocols were used, source or destination information, etc.), timing information (e.g., when the devices communicate, sleep, etc.), and/or any other information regarding the devices that can be used to infer their device types. For example, device telemetry data 508 may take the form of a feature vector in which each dimension represents the presence or absence of a certain protocol in the traffic of the device such as, but not limited to, IPv6, IPv4, IGMPv3, IGMPv2, ICMPv6, ICMP, HTTP/XML, HTTP, etc. In other words, device telemetry data 508 may capture the various behavioral and other attributes of a device in a network.

In turn, device classification process 248 may output a device type classification/label 510 for a device under scrutiny, thereby allowing the receiving entity to apply network policies to the device, based on its device type classification(s)/label(s) 510. For example, one such network policy may cause a networking device to prevent an MRI machine from accessing the Internet or another resource via the network.

In various embodiments, the components 502-506 of device classification process 248 may leverage active learning, to assign device type classification(s)/label(s) 510 to the devices under scrutiny. To do so, clustering module 502 may assign the devices under scrutiny to device clusters 504, based on their telemetry data 508. For example, a device cluster 504 may include those devices that exhibit the same or similar traffic or other behavioral features. If a device type is then associated with a device cluster 504, device labeler 506 may apply that type to a device as device type classification 510. In cases in which device labeler 506 is unable to classify the cluster 504 with sufficient confidence, it may send a label request to a user interface (UI), seeking active labeling of that cluster. In other words, device classification process 248 may be configured to leverage active learning, to learn the labels of unknown devices over time. Note also that the pool of device telemetry data 508 may be from any number of networks and that device labeler 506 may seek labels for a device cluster 504 from any number of experts across any number of networks, as well. Once the cluster is labeled by an expert, device labeler 506 can then apply that label to any other devices that fall within that cluster, as well.

More formally, let $D=\{D_1, D_2, \ldots, D_N\}$ denote the set of devices seen on the one or more networks under analysis by device classification process 248, each of which is identified by its MAC address or another unique identifier. For every device $D_i$ at time t, clustering module 502 may construct a feature vector $X_{i,t}$ from the telemetry data 508 for the device. Clustering module 502 may then apply a clustering algorithm, such as DB-scan, k-means, k-medoids, etc., to create a set of device clusters 504. Let $C_t=\{C_{1,t}, \ldots, C_{K,t}\}$ denote these cluster, where $C_{j,t}$ is the $j^{th}$ set of devices clustered together at time t. As would be appreciated, the number of clusters K is typically smaller, or at most equal, to the number of points N, and the collection of clusters C defines a partition of the set of devices D. In doing so, each device represented in a device cluster 504 may exhibit similar behaviors as those of the other devices in its cluster.

Clustering module 502 may perform the device clustering periodically at a relatively high frequency (e.g., hourly) or at a lower frequency (e.g., weekly). Clustering module 502 can also produce subsequent clustering either by performing new clustering from scratch or by leveraging warm-starting techniques whereby $C_{t+1}$ is obtained by running the algorithm on data corresponding to that time point, but using an initialization based on $C_t$. Whether clustering module 502 uses warm-starting can have a large impact on the 'trajectory' of the clustering and is an important design consideration.

In various embodiments, device classification process 248 may also reclassify a device periodically, at a predefined time, or in response to a request to do so. For example, as the device under scrutiny uses the network, additional device telemetry data 508 can be captured. Generally speaking, the more telemetry data regarding the behavior of the device, the greater the accuracy of the resulting device type classification/label 510. Indeed, there may be slight behavioral differences between devices of different types, leading device classification process 248 to misclassify the device, initially, but correct this misclassification later on in time, as more information about the device becomes available.

According to various embodiments, device labeler 506 may also be configured to generate a device classification rule 512 for a given device cluster 504, based on its associated telemetry data 508, represented as positive and negative feature vectors 514, and the device type labels obtained from experts through active learning. For example, device labeler 506 may aggregate the labels obtained from the experts, to form a finalized device type classification label 510 for the device cluster 504, using any number of conditions (e.g., whether a threshold number of the labels agree, the majority of labels, etc.). In turn, device labeler 506 may associate this label with the telemetry data 508 representative of the device cluster 504, such as the centroid of the cluster, etc.

By generating a device classification rule 512, device labeler 506 can then use this rule to quickly assess the telemetry data for new devices on the network(s). In addition, device labeler 506 can also deploy device classification rule 512 to any number of Identity Service Engines (ISEs) and/or device classification services in the network(s), to perform the device classifications locally. This allows every new device appearing on the network and matching device classification rule 512 to be identified with the corresponding device type.

In practice, device classification rules 512 can be specified manually and/or automatically generated by device classification process 248. This leads to the very real possibility of at least some device classification rules 512 conflicting. For example, a manually-defined rule in a network under scrutiny may conflict with another rule that was automatically generated, other manually-defined rules in the network or other networks. etc.

For purposes of illustration, a device classification rule 512 may take the form of a pair (R, L) where R is a logical statement whose free variables are device attributes that specify whether the device type label L should be applied to a given device (e.g., if the attributes of the device satisfy R). Typically, the label L is a structured object of the form {manufacturer, hardware, software}, for instance, {Apple, iPhone 8, iOS 12.1.23}. In practice, R can be thought of as a low-dimensional manifold in the N-dimensional space spawned by all N attributes that a given device can have, such as its organizationally unique identifier (OUI), HTTP user agent, DHCP parameters, application usages, etc. For example, the following device classification rule 512 may label an endpoint device as an "Apple iPad," if the following conditions are met:

(OUI='Apple') && (DHCP-vendor-class-ID contains 'iPAD')

As noted above, device classification rules can be defined either manually or learned through the application of machine learning to endpoint attributes. In turn, these rules can be used to label endpoints in a network by their device types, allowing the network to apply device type-specific. However, every device classification service (e.g., instances of device classification process 248) may maintain its own set of device classification rules, meaning that certain device classification services may have rules that perform better than others. In addition, opportunities exist to leverage information about the rules to perform rule optimizations.

—Learning and Assessing Device Classification Rules—

The techniques herein introduce systems and methods to learn and assess device classification rules. In some aspects, the techniques herein allow for the global assessment of device classification rules across any number of device classification services by maintaining a universal rule database of rules. This allows for the reliabilities and other metrics of the various device classification services to be quantified and compared. In further aspects, the techniques herein may also leverage the universal rule database to learn the optimal granularity and structure of candidate device classification rules.

Specifically, according to various embodiments herein, a device obtains a set of device classification rules. Each device classification rule specifies one or more attributes from a set of attributes and being configured to assign a device type to an endpoint in a network when the endpoint exhibits the one or more attributes specified by that rule. The device forms a graphical representation of the set of attributes. The device performs an analysis of the graphical representation of the set of attributes. The device provides a result of the analysis to a user interface.

Illustratively, the techniques described herein may be performed by hardware, software, and/or firmware, such as in accordance with the device classification process 248 and rule management process 249, which may include computer executable instructions executed by the processor 220 (or independent processor of interfaces 210) to perform functions relating to the techniques described herein.

Figure 6:
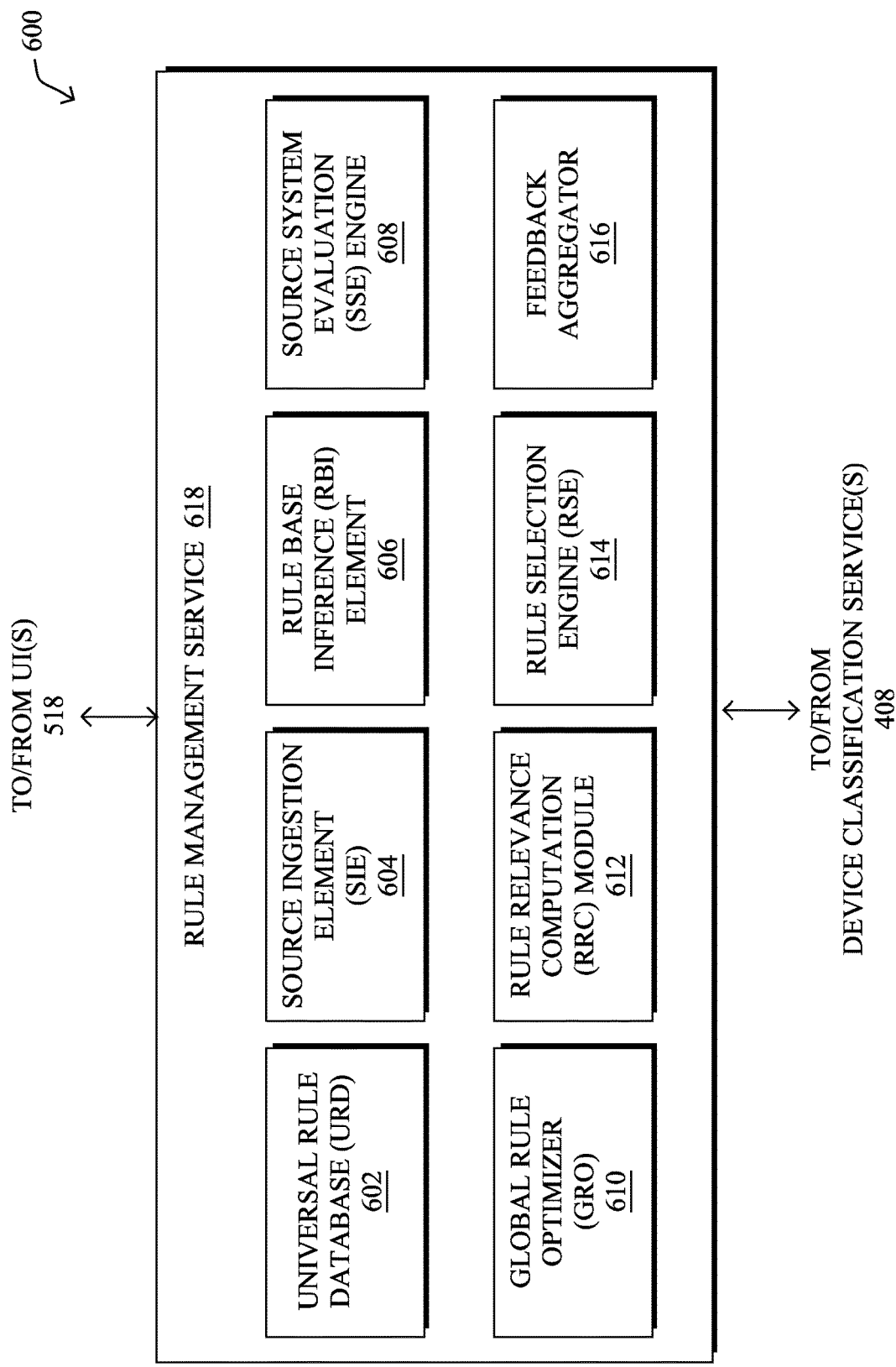
FIG. 6 illustrates an example architecture for learning and assessing device classification rules.

FIG. 6 illustrates an example architecture 600 for learning and assessing device classification rules, according to various embodiments. At the core of architecture 600 may be a rule management service 618 (e.g., an instance of rule management process 249) that operates in conjunction with any number of instances of device classification services 408. For instance, rule management service 618 may be executed in the cloud to provide a rule management service to any number of instances of device classification services for any number of different networks. As shown, rule management service 618 may comprise any or all of the following components: a universal rule database 602, a source ingestion element (SIE) 604, a rule base inference (RBI) element 606, a source system evaluation (SSE) engine 608, a global rule optimizer (GRO) 610, a rule relevance computation (RRE) module 612, a rule selection engine (RSE) 614, and/or a feedback aggregator 616. The components 602-616 may be implemented either on a single device or in a distributed manner, in which case the combined devices may be viewed as a singular device for purposes of implementing the techniques herein. Further, the functionalities of the components of architecture 600 may also be combined, omitted, or implemented as part of other processes, as desired.

To better illustrate the operations of architecture 600, a number of assumptions can be made. First, it can be assumed that each device classification service 408 translates the telemetry data for the endpoints in its respective network into a global and consistent feature vector (e.g., through execution of device classification process 248). Typically, such a feature vector is a highly sparse, binary vector. As noted above, the endpoint telemetry data may include heterogeneous attribute information coming from multiple sources, such as networking probes, location information, traffic information, and others. This attribute information can be of various forms such as categorical in nature (e.g., OUI information), structured text (e.g., HTTP User-Agent), real-valued (e.g., volumes of bytes/packets exchanged over a given protocol), geographic coordinates (e.g., localization information), or the like.

To convert the various forms of attribute information regarding the endpoints into a device classification rule, the various attributes can be converted into a uniform format through the use of binarization or the like. To this end, different conversion techniques could be applied to each type of attribute information. For example, categorical attribute information can be one-hot-encoded. Similarly, vocabulary learning could be applied to structured text and the learned vocabulary used to check for the presence of certain words in the captured strings. Location information can, for example, be used to infer categories of mobility patterns, and real-valued information can be binarized by means of binning. The so-obtained feature representation of the endpoint attributes can then be used to build a so-called concept lattice, as will be explained below.

As shown, rule management service 618 may maintain a universal rule database (URD) 602 that stores the device classification rules obtained from the various device classification services 408. URD 602 may potentially include upwards of millions of device classification rules matching hundreds of thousands of device types or more. These rules can be collected in a range of ways such as: via active probing of third-party systems, manual rule creation from users, assisted rule creating using active labeling, or via a software development kit (SDK) or application programming interface (API) offered to device vendors or other entities. Any endpoint whose attributes do not match at least one rule in URD 602 may also be flagged as 'UNKNOWN.' In other words, URD 602 can be thought of as the totality of knowledge about all rules across device classification services 408, such as their definitions, the telemetry datasets that they assess, and the like.

According to various embodiments, architecture 600 may operate to cons single representation of the device classification rules in URD 602 and/or the various endpoint attributes on which they are conditioned. To this end, architecture 600 may also include source ingestion element (SIE) 604, which takes as input two types of data, depending on what the source device classification service 408 may be able to provide to rule management service 618:

Attribute-label pairs: SIE 604 takes as input the attributes of a given endpoint and the corresponding label assigned by the source device classification service 408. This data can be used for different purposes, such as to infer the device classification rule that generated the device type label. In some embodiments, this information can be provided to rule management service 6/8 when the source device classification service 408 does not allow an export of its underlying rule base for inclusion in URD 602.

Raw rules: When the source device classification service 408 allows it, SIE 604 takes as input the actual device classification rules used by that device classification service 408, whose format may be a logical expression, a tree, or a list of attribute-value pairs. Regardless of the format, SIE 604 can be thought of as a type of compiler, which supports different source languages and that can be extended with a number of frontends.

In a typical implementation, SIE 604 may communicate with device classification service(s) 408, or be implemented as a component thereof, to ingest every classification produced by that system and the corresponding attributes of the endpoints in the network. In turn, SIE 604 may store this information in URD 602, along with metadata about the source device classification service 408 (e.g., the name of the system, its software version, configuration, etc.).

Architecture 600 may also include rule base inference (RBI) element 606 which takes the data available in URD 602 and builds what is referred to herein as a Master Tree Representation (MTR) of the rules in URD 602 that were provided directly by device classification services 408 or inferred from provided attribute-label pairs. To build an MTR of the device classification rules, RBI element 606 may start taking the most common conditional statements across all rules (e.g., HTTP.User-Agent contains 'Android') and creates the first node, followed by the next most common condition excluding the first, etc. This process continues until no additional conditions remain on the first branch. Then, the process resumes for each branch created, conditioned by the previous conditions.

Figure 7:
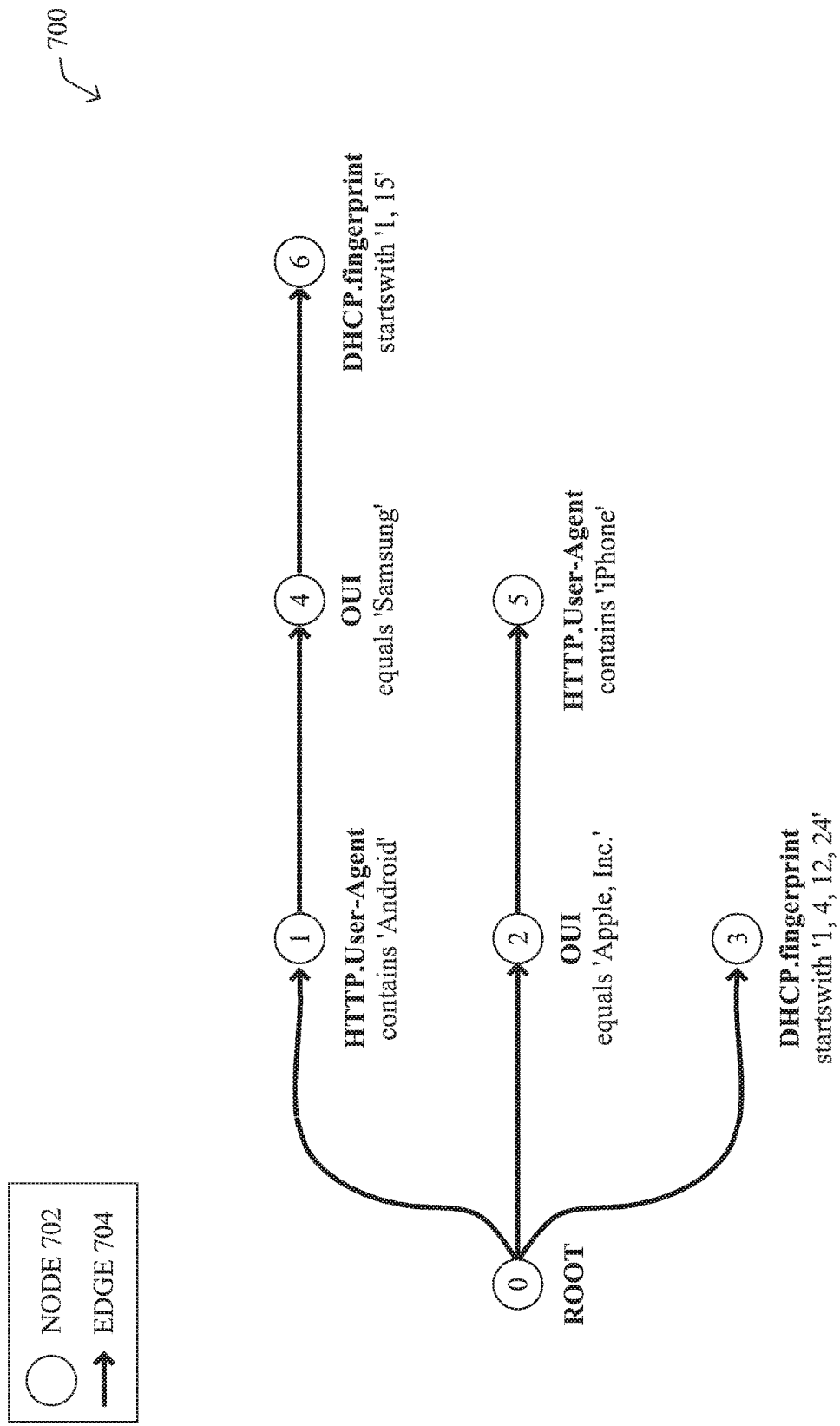
FIG. 7 illustrates an example master tree representation of device classification rules.

FIG. 7 illustrates an example master tree representation (MTR) 700 of device classification rules, according to various embodiments. As shown, various nodes 702 are created to represent the various endpoint attributes on which the device classification rules are conditioned that are interconnected by directed edges 704. Traversal of a series of edges 704 represents the logical combinations of the attribute conditions.

More specifically, MTR 700 may be formed beginning with a root node 702 and then identifying the most prevalent attribute condition among the device classification rules in URD 602, e.g., "HTTP.User-Agent contains 'Android'" and creating a corresponding node 702 to represent this and stemming from the root node. Then, the next most prevalent attribute condition, "OUI='Apple, Inc." is identified and a corresponding node 702 created as a child node of the root. Finally, a third most prevalent attribute condition, "DHCP.fingerprint starts with '1, 4, 12, 24'" is identified and a child node 702 of the root node 702 is created.

Next, the process resumes for each branch of MTR 700 created, conditioned by the previous conditions. For instance, the condition "OUI='Samsung'" is the most frequent attribute condition used in the device classification rules given that "HTTP.User-Agent contains 'Android'." Note also that a given device classification rule may be associated with more than one node 702 in MTR 700, such as when the rule uses an OR to logically connect attribute conditions. In the end, a rule may be represented as a set of pointers to different nodes 702 of MTR 700.

Referring again to FIG. 6, RBI element 606 may build an MTR incrementally as new device classification rules are received by rule management service 618. In addition, RBI element 606 may also augment the MTR with metadata. For instance, every node in the MTR may be associated with the list of classification labels assigned by some of the source device classification service 408 to one or more endpoints matching the node. Each label may also be associated to a number of matching endpoints. For instance, the node 702 in FIG. 6 representing "DHCP.fingerprint starts with '1, 15'" may be associated with two different device type labels: "Samsung Galaxy" and "Samsung Television." RBI element 606 may also track the number of unclassified endpoints for each node in the MTR that are matched by this node.

As mentioned previously, not all source device classification services 408 may expose their rule base directly to rule management service 618. In such cases, RBI element 606 may use machine learning to guess the rule $R_L$ used to generate a given label L. To this end, RBI element 606 may leverage a tree-based classifier (e.g., a simple decision tree or a random forest) that was trained on a dataset wherein positive samples consist in all endpoints labeled L and negative samples are endpoints not labeled L by the same system. Typically, given the variety of physical devices, negative samples can be very different from positives. For this reason, negative samples are picked by a process of hard-negative mining, whereby negatives, rather than being sampled at random, are selected among the nearest neighbors of positive samples. This, as a result, yields a more discriminative and accurate representation of the decision boundary. Once an accurate model is obtained, the underlying trees are turned into a rule via a normalization process, which is integrated into the MTR.

According to various embodiments, rule management service 618 may also include source system evaluation (SSE) engine 608, in various embodiments. During execution, SSE engine 608 may assess the MTh generated by RBI element 606, to infer various properties of the source systems, such as the various device classification services 408. For instance, SSE engine 608 may compute the level of conflict between the device classification rules within and between the source systems. Notably, conflicting rules may point to a node with more than one classification label from the same system. Similarly, SSE engine 608 may evaluate the level of agreement between device classification services 408 by measuring the similarity of the labels in different regions of the MTR. Note that this level of agreement can be made conditional on some attributes, in some cases. For instance, two device classification services 408 may be very consistent conditioned on 'Apple' and 'Samsung' devices, but not so on 'ThermoFisher' and 'Siemens' devices. Many such metrics can be extracted by SSE engine 608 from the MTR.

Another metric that SSE engine 608 may measure is the stability of the classifications of a given source device classification service 408. For instance, SSE engine 608 may determine whether the device type classification by a particular service 408 of an endpoint changes over time and/or when new attributes are observed for that endpoint. In addition, SSE engine 608 may identify device type classifications that cycle or flip-flop between a few possible values, revised classifications that get progressively finer or more detailed (e.g., 'iOS device'→'iOS 11.2 device').

Yet another metric that SSE engine 608 may compute is the amount of time that a particular device classification service 408 takes to classify an endpoint after first appearing on the network. Indeed, certain systems may classify endpoints quickly by basing their device type classifications on information that is readily available at the time of onboarding. On the other end, other systems may need to observe specific network traffic (e.g., for deep packet inspection) and require more time to classify the endpoints. Accordingly, the "time-to-classify" can be an important factor when characterizing the performance of the source device classification service 408.

In yet another embodiment, SSE engine 608 may assess the degree of user acceptance of device classification rules, to help compute the confidence level for a particular device classification service 408.

In some cases, SSE engine 608 can be queried by other system via APIs, to provide information regarding its assessment of device classification service 408. In a first embodiment, an endpoint and its attributes may be submitted to SSE engine 608, which returns a ranking of device classification services 408, based on their reliability scores. SSE engine 608 may evaluate the endpoint against the MTR and measures the level of conflict and agreement among systems in this region of the MTR. To do so, SSE engine 608 may leverage various heuristics to compute a reliability score, which will induce a ranking of the source systems/services 408.

In another embodiment, a device classification rule may be submitted to SSE engine 608, which returns precise statistics regarding the accuracy of the rule (e.g., in the form of the number of agreeing and conflicting rules, with the number of endpoints and customers impacted across the world). Such information could be used, for instance, by third-party systems in order to assist a user with custom rule creation.

In a further embodiment, SSE engine 608 may also provide, via UI(s) 518, high-level dashboards or other information regarding the strength and weaknesses of different device classification services 408 across the whole spectrum of endpoints. These dashboards may be used, for example, to select the best device classification service 408 vendor or adjust network policies based on the reliability of their current service 408 in use.

In yet another embodiment, assume that one of device classification services 408 leverages crowd sourcing to define its device classification rules. In such a case, the service 408 could query SSE engine 608 about the reliability of custom rule sets coming from different users. The device classification service 408 could then use the resulting scoring as an indication of how knowledgeable the users are and take this into account to reweight the feedback received from different users.

Another potential component of rule management service 618 is global rule optimizer (GRO) 610, which takes as input the MTR generated by RBI element 606 and performs a set of operations to optimize the MTR. More specifically, GRO 610 may attempt to maximize the agreement between the source device classification services 408 and minimize the number of rule conflicts. To do so, GRO 610 may select only one classification label per device classification rule, typically based on heuristics such as majority voting across source service 408, and weighted by the (local) reliability score of every source service 408. Similarly. GRO 610 may trim device classification rules that are deemed too detailed (e.g., by identifying agreement from other sources on coarser version of the rule) or remove rules that are too coarse (e.g., by identifying conflict at this level and/or agreement in deeper nodes of the MTR). This does not need to be propagated back to the source classification service 408, which may not support such information. Instead, the correct output label can be simulated based on the MTR by the GRO 610.

As would be appreciated, when dealing with unknown endpoints, one challenge relating to device classification rule generation is to identify the correct granularity at which a rule classifies different types of endpoint devices. Granularity here it is to be meant as the level of generality, or conversely, precision, the proposed rule has in describing the devices it is classifying. For example, consider a set of thermometers and laser sensors used to count people moving in and out of a building. One possible way to classify those could be as general as IoT devices, and the correspondent rule may just rely on checking whether specific protocols dedicated to IoT communications are used. A second classification could distinguish them between thermometers and laser sensors, the two rules could integrate activity patterns, the thermometers sending data periodically, whilst the laser sensor sending information predominantly during office hours. A third classification can go as far as dis the different thermometers and laser sensors by their manufacturer model name and maybe even mode version number, where rules would take into consideration more information about the manufacturers, the DHCP fingerprints, specific IP addresses reached by the devices, and other fine-grained information. To make the problem even more complex, different device classification services 408 may be interested in different granularities for the same type of device. For example, in a hospital, it might be critical to have a finer-grained level of classification for thermometers, pressure sensors, and light sensors, while in a commercial building those very same devices could be easily just classified as DoT sensors.

Accordingly, another functionality of rule management service 618 may be to aid in the learning of relevant device classification rules with suitable granularity for unknown devices, which can greatly influence the level of user satisfaction for a given device classification service 408. To do so, rule management service 618 may build a hierarchy of rules, and learn which level in the hierarchy to pick based on the knowledge that it has about what a good device classification rule looks like. Such knowledge is built from the rule information stored in URI) 602 and obtained from the various source device classification services 408 (e.g., the raw rules, attribute-label pairs, user feedback regarding the rule definitions, etc.). Based on this information, rule management service 618 can learn what a satisfactory device classification rule may look like and refine such a general notion on an individual basis.

According to various embodiments, rule management service 618 may include rule relevance computation (RRC) module 612 which is configured to form a representation of all of the rules that can be built for a set of endpoints seen on a particular network, based on their attributes. In various embodiments, such a representation may take the form of a concept lattice constructed using Formal Concept Analysis (FCA) with two objectives:
1. The concept lattice enumerates all the possible rules that can be created on the basis of a set of endpoint devices and their attributes.
2. The concept lattice establishes the hierarchical relationships across those device classification rules, where the hierarchy can be thought as referring to different levels of granularity in the discrimination abilities of the rules.

In other words, similar to the MTR formed by RBI element 606 for use by SSE engine 608 to evaluate device classification services 408. RRC module 612 may form a graphical representation of the various endpoint attributes on which device classification rules can be formed. To do so, RRC module 612 may apply FCA to the binary attribute vectors, described previously, on which a device classification rule may be based. For N-number of endpoint devices (objects) these binary vectors form an N×M matrix, the so-called "formal context." Groups of similar devices correspond to "concepts" in FCA, whereby each concept consists of a set of objects O, called the extent in FCA terminology, and a set of attributes A, called the "intent." Concepts are precise, that is, every object in O matches every attribute in A. Concepts are also complete: for every object that is not in O, there is at least one attribute in A that the object does not have.

Concepts are also complete in their attributes: for every attribute that is not in A, there is some object in O that does not have that attribute. If, for example, all thermometers in some network have the same OUI and DHCP fingerprint, then there will be only one concept containing all thermometers and its intent must contain both their OUT and their DHCP fingerprint, even if these specific OUI or DHCP fingerprint would already be enough to identify the thermometers, accurately.

Figure 8:
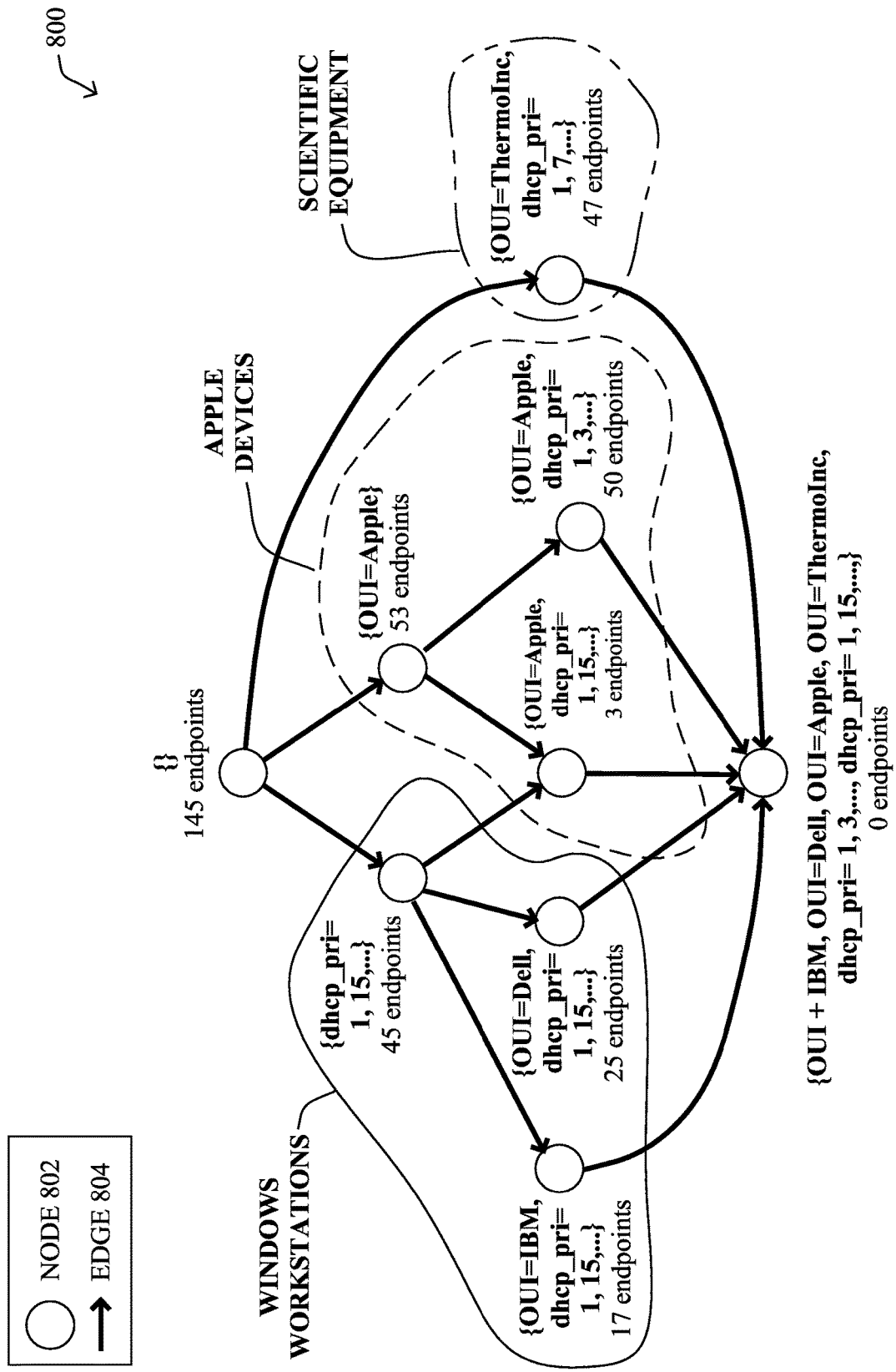
FIG. 8 illustrates an example concept lattice of endpoint attributes.

FIG. 8 illustrates an example concept lattice 800 that may be constructed by RRC module 612, according to various embodiments. In the simplified example shown, assume that 145 different endpoint devices were observed in a network and that these endpoints fall into three broad classes of devices: 1.) Windows workstations, 2.) Apple devices, and 3.) scientific equipment manufactured by ThermoFisher. Collectively, these endpoints exhibited seven binary attributes: four possible MR strings and three possible DHCP parameter request lists.

To begin, a root node 802 is created that requires no attribute matches and, thus, captures all 145 endpoint devices. In other words, the root node 802 in concept lattice 800 represents the most genera concept, also known as the supremum in FCA terminology. From there, a DAG is formed that stems from the root node 802 and each subsequent node 802 represents one or more of the possible endpoint attributes and each directed edge 804 between nodes 802 indicates an increasing degree of specificity.

For instance, the root node 802 in concept lattice 800 has three children nodes 802: a first node 802 that represents the concept of {dhcp_pri=1, 15, . . . }, e.g., DHCP fingerprints that start with 1, 15, etc., which was exhibited by 45 of the endpoints, a second node 802 that represents the concept {OUI=Apple}, e.g., an OUI equal to "Apple," which was exhibited by 53 of the endpoints, and a third child node 802 that represents the concept {OUI=ThermoInc, dhcp_pri=1, 7, . . . }, e.g., an OUI equal to "ThermoInc" and a DHCP fingerprint that starts with 1, 8, etc., which were exhibited by 47 of the endpoints. From these initial children nodes 802 from the root node, it can be seen that the OUI attribute is not a defining, common attribute for Windows workstations, but is for Apple device and for scientific equipment (e.g., thermostats).

While the three initial concepts of concept lattice 800 could be used as the basis for device classification rules, there would be some overlap. Indeed, three of the Apple devices were found to exhibit DHCP fingerprints starting with 1, 15, which were likely Apple workstations or laptops also running Windows. Therefore, a better classification might be to go to a lower node 802 in concept lattice 800, such as the node 802 representing the concept of {OUI=Apple, dhcp_pri=1, 3, . . . } and replace the "Apple Devices" with the more specific class/label of "Apple Devices running OS X." Alternatively, one could go even finer and use both OUI and dhcp_pri every which would result in five fine-grained and dstnct classes, corresponding to Windows workstations manufactured by IBM and Dell, Apple devices running Windows, Apple devices running OS X, and scientific equipment manufactured by ThermoFisher.

By analyzing which extents and intents are subset and superset of each other the concepts are linked upward (e.g., to more general super-concepts with smaller intent and larger extent) and downward (e.g., to less general sub-concepts with larger intent and smaller extent). Thus, moving down in the DAG of concept lattice 800, the concepts get more specific (larger intent, smaller extent). Finally, the terminal node 802 of the DAG in concept lattice 800 is infimum: it has all attributes in its intent, and is associated with none of the endpoints. This is because several of the attributes, such as OUI, are mutually exclusive.

From a device classification rule standpoint, the resulting concept lattice, such as concept lattice 800, provides the complete hierarchy of all relevant (non-trivial), simple, positive rules. These rules are of the form "all endpoints in this concept have attributes A AND B AND C," using only AND as the logical operator. This means that no OR operators or NOT operators are needed to define the rule. In addition, since edges 804 are directed, further traversing the DAG moves towards a higher degree of granularity and can be used for reasoning on the concepts and their relation, because of this lattice property.

Referring again to FIG. 6, RRC module 612 may estimate the relevance of every rule in the DAG of the concept lattice produced by applying FCA, based on their "similarity" to the existing rules in URD 602. The intuition here is that "good" device classification rules share similar features and exhibit similar structures. To this end, RRC module 612 may take as input all candidate device classification rules in the concept lattice and compare them with every rule in URD 602 or a subset thereof. As a result, RRC module 612 enriches the concept lattice by adding to each new rule R a relevance score that is a function of the similarity between R and every rule R' in URD 602.

In one embodiment, RRC module 612 may measure the similarity between two device classification rules based on a range of descriptive properties of the rules. For example, consider the following two rules:

R-1:[OUI=="Samsung" && User-agent containing "Mobile" && DHCP-params=="1,23,9" && DHCP-Class-ID==Android]

R-2:[OUI="Apple" && User-agent containing "Mobile" && Network-Element-Type=="macOS"]

In such cases, RRC module 612 may compute any or all of the following:

Relative number of conditions in the rules—that is, the absolute value of the difference of cardinalities of contemplated conditions divided by the maximum of the two cardinalities. Thus, in the above example, R-1 has four conditions and R-2 has three, so the relative number of conditions is 0.75.

Jaccard similarity of used attributes—that is the intersection over the union of sets of attributes used by the two rules. In the above example, R-1 uses OUI, User-Agent, DHCP-params, and DHCP-Class-ID, while R-2 uses OUI, User-Agent, and NetworkElementType. The intersection of those two sets consists of two attributes while the union consists of five, so the Jaccard similarity is 0.4.

Each of the above scores can then be reweighted and recombined by RRC module 612 to generate a global similarity score between two rules. Finally, RRC module 612 may aggregate the similarity scores of R with every other rule in URD 602 to yield a final relevance score.

In more complex embodiments, RRC module 612 may learn the similarity metrics by means of more sophisticated techniques. For example, it is possible to train an auto-encoder neural network on some suitable representation of the rule. Then, it is possible to use some measure of distance in the embedded space as a notion of similarity across devices.

The outcome of the processing by RRC module 612 is a concept lattice, such as concept lattice 800 in FIG. 8, that is augmented with the computed relevance scores.

Another potential component of rule management service 618 may be Rule Selection Engine (RSE) 614, which functions to select the most relevant device classification rules among those listed in the concept lattice formed by RRC module 612 and based on the relevance scores computed by RRC module 612. In a second phase, relevance scores can be refined based on the feedback of users about the selected rules received via UI(s) 518.

To understand the operation of RSE 614, the notion of closely related rules must first be understood. More specifically, given a device classification rule R, the set of rules closely related to R is defined as a set of rules that lie on the path between the supremum and the infimum of the concept lattice.

Figure 9:
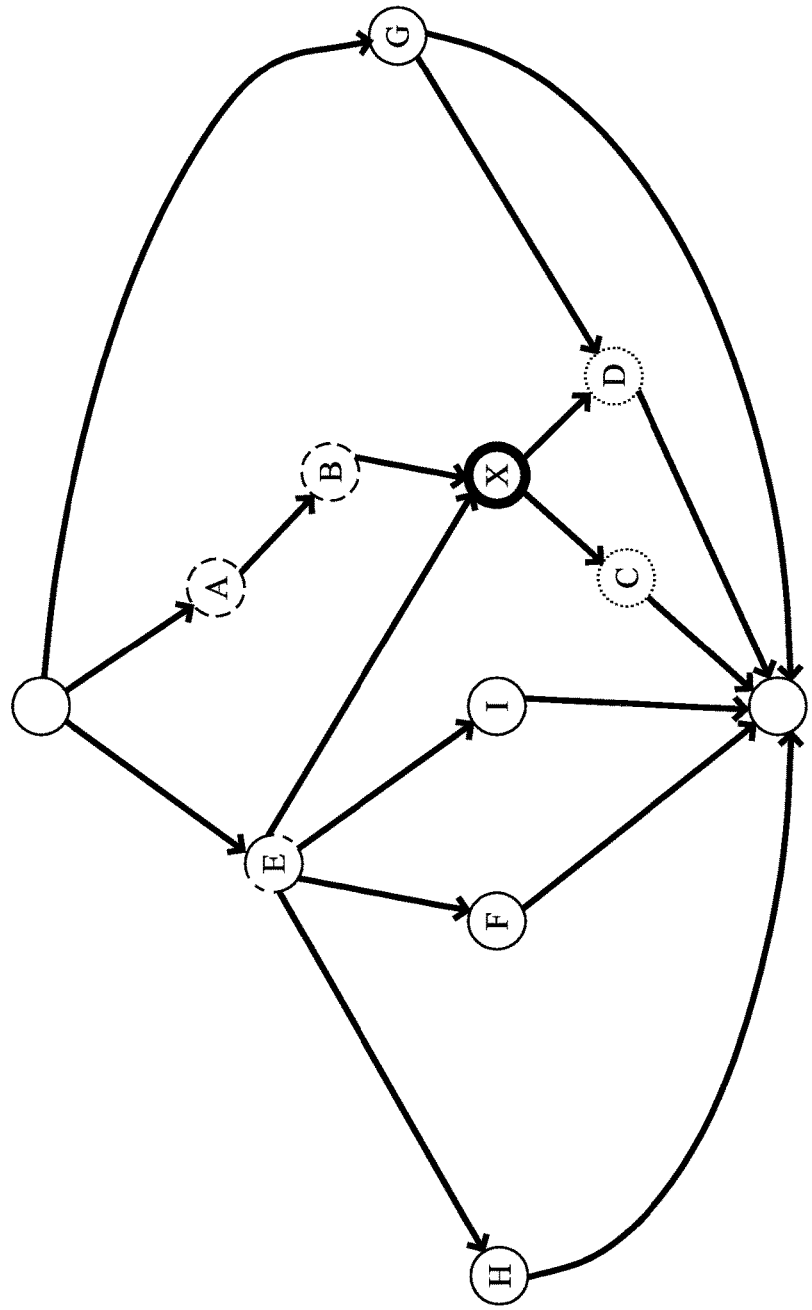
FIG. 9 illustrates an example of closely related device classification rules.
Figure 9:
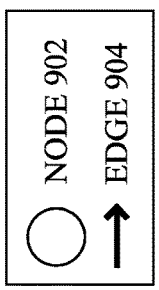

FIG. 9 illustrates an example of closely related device classification rules, according to various embodiments. As shown, assume that there is a concept lattice 900 comprising nodes 902 that represent different concepts/rules/sets of attributes and are interconnected via edges 904, thereby forming a DAG. Let the node 902 marked 'X' be the rule of interest. The rules that are closely related to X are those rules that either 1.) cannot reach the infimum without passing through X, such as the nodes 902 marked 'A' and 'B,' or 2.) lie between 'X' and the infimum, such as the nodes 902 denoted 'C' and 'D.' Note that even the node 902 marked 'E' is not closely related to X because it may reach the infimum without passing through X (e.g., through the nodes 902 marked 'H,' 'F,' or 'I').

Referring again to FIG. 6, RSE 614 may iteratively search the concept lattice formed by RRC module 612 for the rule R that has the highest relevancy score in the DAG. It the score of R is higher than a given threshold T, RSE 614 may flag that node and prune the DAG of all closely related rules to R. Then, RSE 614 may search for the next unselected rule in the DAG with the highest relevance score. When no rule with a relevance larger than T remains, RSE 614 may stop its searching. In one embodiment, the value of T can be adjusted based on user feedback received via UI(s) 518. For instance, when a user rejects a rule R with a relevance score of X, the threshold T may be increased to this value, oftentimes with some inertia factor so as to avoid oscillations.

In another embodiment, RSE 614 may teach a reinforcement learning (RL) agent to optimally select rules by traversing the DAG of the concept lattice formed by RRC module 612 in depth-first fashion from supremum to infimum. For every node, the agent takes as input the bare description of the rule, that is, the set of conditions/attributes. In turn, it may decide to perform one of the following actions:

Select the rule under consideration: in this case, the rule is selected to be shown to the end user and, similar to the other embodiment, all its closely related rules would be removed from the DAG, and the agent would move back to the supremum.

Traverse downward to evaluate a new rule: in this case, the agent either finds itself on a new rule, or it reaches the infimum. In the second case, all rules in the path taken by the agent would be removed from the DAGs to ensure rules are not considered twice.

The RL agent may stop navigating the DAG of the concept graph tonly when there is no rule left between the supremum and the infimum. Finally, the reward to the agent can be computed as the sum of rewards for all the selected rules. The individual rule reward can be computed as a function of 1.) the relevance score of the selected rules, as defined above, and (2.) the feedback from the user about the selected rules. The key advantage of using an RL-based approach is that complex strategies may be learned, wherein the optimal structure depends on the "region" of the DAG (e.g., given that the OUT is "Apple," an optimal rule may be one that uses the DHCP fingerprint and the token "iOS" from the HTTP User-Agent). Example forms of reinforcement learning that can be leveraged may include, but are not limited to, Q-learning, State-Action-Reward-State-Action, and Deep Q Networks.

In yet another embodiment, the RL agent of RSE 614 could be trained on a large number of different sources, based solely on the similarity score and then refine its knowledge on a per-network basis by integrating the network-specific feedback. This would be particularly easy to implement when modeling the agent by means of a neural network, which supports incremental training.

Finally, as shown, rule management service 618 may also include feedback aggregator 616, which is responsible for collecting feedback from the user via UI(s) 518. This feedback may be collected by sending the device classification rules generated by RSE 614 to UI(s) 518. In turn, the user can either accept or reject the presented rule. In another embodiment, the rejection of a rule can also include structured feedback. For instance, the user may provide information indicative of whether the proposed rule is too general or too specific, in their opinion. Such feedback can be collected by feedback aggregator 616 for each target network to which the rules are to be deployed, allowing RSE 614 to tailor its rule selections to the target networks. For example, in a hospital, it might be critical to have a finer-grained level of classification for thermometers, pressure sensors, and light sensors, while in a commercial building those very same devices could be easily just classified as IoT sensors.

A prototype system was implemented to demonstrate the efficacy of the rule generation techniques introduced herein. The prototype was written in Python and used to infer the best device classification rules for two different networks, each network comprising approximately twenty thousand devices. Most of these devices were already of known device types, having matched pre-existing device classification rules. The remaining devices were labeled as "unknown" and totaled only a few hundred.

Binary feature vectors were generated using one-hot encoded OUIs, DHCP parameter request lists, DHCP class identifiers, and some keyword (token) matched to user-agent strings. For some devices, additional information from a Mobile. Device Management (MDM) system was also included in the attribute vectors. This resulted in approximately one thousand unique binary attribute vectors and a hierarchy of roughly two thousand formal concepts.

Each of the concepts was then assigned to one of approximately 100 existing device labels, by taking the most frequent device label found among the devices in the extend of that concept. This results in several possible concepts for most of the pre-existing labels and the problem is to find the best match. For this, the precision (fraction of extent which has the most frequent label) and recall (fraction of devices with this label found inside the extent) were computed for each concept. Then all of the labels were assessed: if there are closely matching concepts (e.g., precision and recall above 90%), the best matching one was assigned to this label (e.g., based on F1-score, the harmonic mean of precision and recall). As a result, a simple rule is generated as the logical AND combination of the attributes in the concept's intent, which reproduces an existing rule accurately. In many cases, this was done perfectly, with an F1-score=1.0. Overall, this procedure worked well for many labels and averaged over all devices F1-scores of 80%.

Testing also revealed that some labels cannot be matched closely by one single concept, but there are often two or more concepts which have high precision. For example, endpoints labelled "Windows workstation" might be spread over a couple of concepts defined by a couple of different, but very distinct DIRT fingerprints. Allowing a label to be associated with several concepts in such cases increases the fraction of rules that can be accurately re-engineered. Now the rules are the OR combinations of several basic rules of the type described above. Allowing such combinations of several concepts increases the average F1-scores to over 90%, meaning that the rules for most known endpoints have been re-engineered with high accuracy.

In addition, the prototype was also able to suggest new device classification rules for each class of previously 'unknown' endpoints. To do so, the concepts were selected that contain mostly devices with the "unknown" label with a high degree of precision (e.g., over 90%). High recall is not required, as the unknown endpoints may be from very different device classes. Out of this selection of possible concepts and resulting in new rules, which the system could propose to the user, the prototype only needs to find those which are at a suitable level of granularity.

Figure 10:
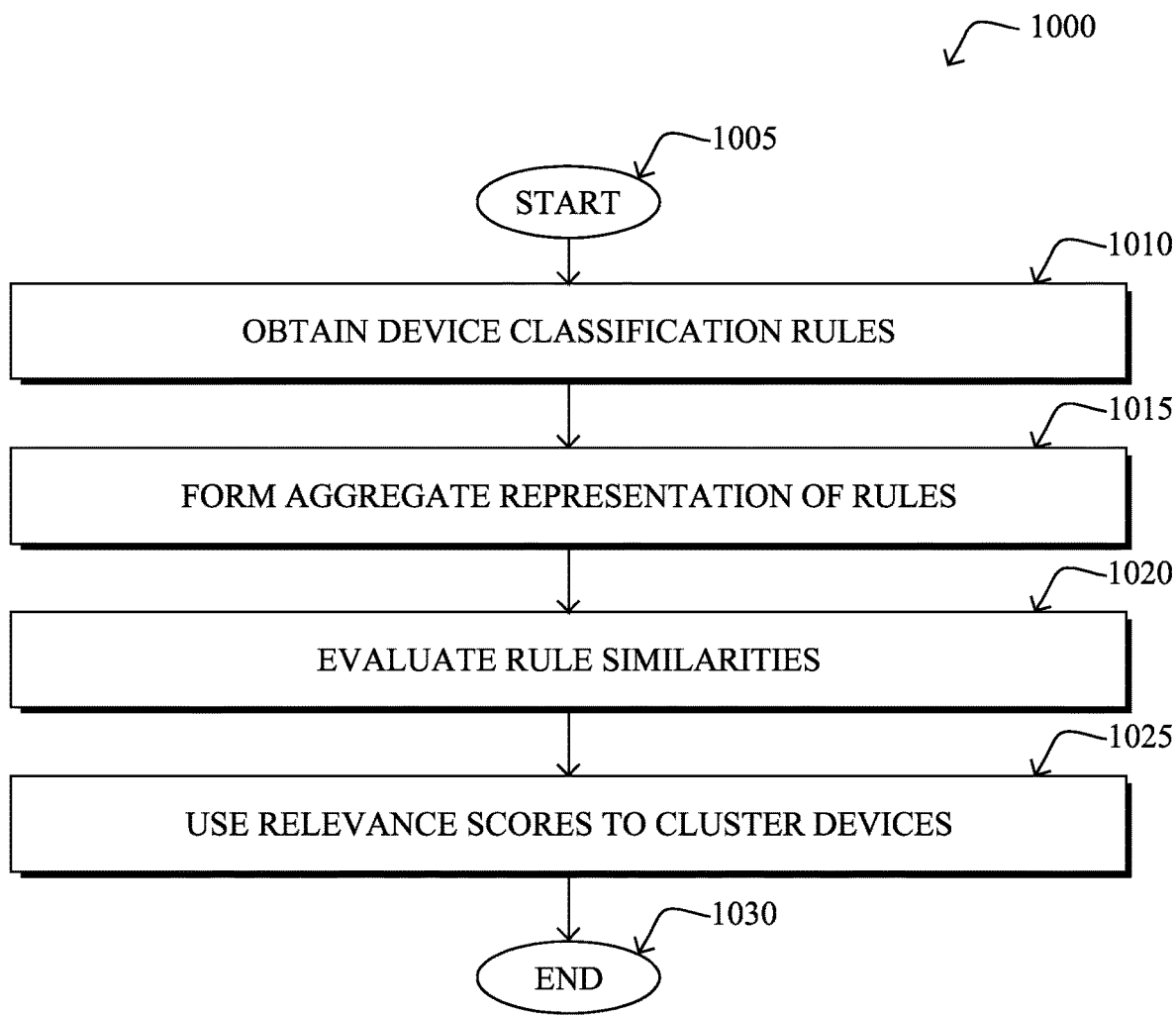
FIG. 10 illustrates an example simplified procedure for learning and assessing device classification rules.

FIG. 10 illustrates an example simplified procedure 1000 for learning and assessing device classification rules, in accordance with one or more embodiments described herein. For example, a non-generic, specifically configured device (e.g., device 200) may perform procedure 1000 by executing stored instructions (e.g., process 248), to provide a rule management service to one or more networks and/or to any number of device classification services. The procedure 1000 may start at step 1005, and continues to step 1010, where, as described in greater detail above, the device may obtain a set of device classification rules. In general, each device classification rule specifying one or more attributes from a set of attributes and being configured to assign a device type to an endpoint in a network when the endpoint exhibits the one or more attributes specified by that rule. For instance, the device may receive the rules from any number of different device classification services that may be in use across any number of different networks and, potentially, from different vendors, as well. In various embodiments, the device type assigned by a particular rule may be indicative of one or more of: a manufacturer of the endpoint, a model of the endpoint, or a software version associated with the endpoint.

At step 1015, as detailed above, the device may form a graphical representation of the set of attributes. In some embodiments, the graphical representation of the set of attributes may take the form of a master tree representation of the set of device classification rules. In other embodiments, the graphical representation of the set of attributes may take the form of a concept lattice generated based on the attributes exhibited by a plurality of endpoint devices in a network (e.g., by applying FCA to the attributes). As a result, the nodes in the lattice will represent a plurality of potential device classification rules.

At step 1020, the device may perform an analysis of the graphical representation of the set of attributes, as described in greater detail above. For instance, if the representation is a master tree representation of the device classification rules obtained by the device, the device may use the tree to determine metrics comprising at least one of: measures of conflict among the set of device classification rules, measures of stability of classifications by the device classification rules, or measures of time needed to apply the device classification rules to endpoint devices. Thus, if the device obtains the rules from a plurality of source systems/services, the device may use this information to provide a comparison of the plurality of sources to a user interface. In addition, the device may use these metrics to optimize at least one of the rules in the set. In further embodiments, such as when the graphical representation takes the form of a concept lattice that represents a plurality of potential device classification rules, the device may compute relevancy scores for these potential rules based on their similarities to each of the obtained device classification rules and select one of the potential rules based on its relevancy score.

At step 1025, as detailed above, the device may provide a result of the analysis of the graphical representation of the set of attributes to a user interface. In some embodiments, the result may take the form of a comparison of different source systems/services of the obtained device classification rules, such as how reliable their device classification rules are. In further embodiments, the device may even suggest a new device classification rule to the user interface that results from the analysis. In turn, the device may receive feedback regarding the particular device classification rule, which can be used to adjust how the device generates new rules in the future. Procedure 1000 then ends at step 1030.

It should be noted that while certain steps within procedure 1000 may be optional as described above, the steps shown in FIG. 10 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for device classification rules from a variety of different sources to be compared and assessed through the use of a universal rule database. In addition, the techniques herein also provide mechanisms for generating new device classification rules by leveraging the universal rule database to identify a rule the with the best degree of granularity. Such identifications can also be done on a per-target network basis, taking into account what users found to be of interest.

While there have been shown and described illustrative embodiments that provide for learning and assessing device classification rules, it is to be understood that various other adaptations and modifications may be made within the spirit and scope of the embodiments herein. For example, while certain embodiments are described herein with respect to using certain models for purposes of device type classification, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   obtaining, by a device, a set of device classification rules, each device classification rule specifying one or more attributes from a set of attributes and being configured to assign a device type to an endpoint in a network when the endpoint exhibits the one or more attributes specified by that rule;
   forming, by the device, a graphical representation of the set of attributes by generating a concept lattice based on the set of attributes that represents a plurality of potential device classification rules, wherein the graphical representation of the set of attributes comprises a plurality of nodes and a plurality of edges interconnecting the plurality of nodes, each node representing a particular subset of the set of attributes being exhibited by one or more endpoints in the network, and each edge representing a relationship between two nodes;
   performing, by the device, an analysis of the graphical representation of the set of attributes;
   selecting, by the device and based on the analysis of the graphical representation of the set of attributes, a particular device classification rule from among the plurality of potential device classification rules configured to assign a device type to the one or more endpoints; and
   providing, by the device, a result of the analysis to a user interface.

2. The method as in claim 1, wherein the device type is indicative of one or more of: a manufacturer of the endpoint, a model of the endpoint, or a software version associated with the endpoint.

3. The method as in claim 1, wherein performing the analysis of the graphical representation of the set of attributes:
   computing relevancy scores for the plurality of potential device classification rules based on their similarities to each of the set of device classification rules; and
   selecting the particular device classification rule from among the plurality of potential device classification rules based on its relevancy score.

4. The method as in claim 3, wherein providing the result of the analysis to the user interface comprises:
   providing the particular device classification rule to the user interface; and
   receiving feedback regarding the particular device classification rule from the user interface.

5. The method as in claim 1, wherein forming the graphical representation of the set of attributes comprises:
   generating a master tree representation of the set of device classification rules.

6. The method as in claim 5, wherein performing the analysis of the graphical representation of the set of attributes comprises:
   using the master tree representation to determine metrics comprising at least one of: measures of conflict among the set of device classification rules, measures of stability of classifications by the device classification rules, or measures of time needed to apply the device classification rules to endpoint devices.

7. The method as in claim 6, further comprising:
   optimizing at least one of the set of device classification rules based on the metrics.

8. The method as in claim 5, wherein the set of device classification rules are obtained from a plurality of source systems, and wherein providing the result of the analysis to the user interface comprises:
   providing a comparison of the plurality of source systems to the user interface.

9. An apparatus, comprising:
   one or more network interfaces;
   a processor coupled to the one or more network interfaces and configured to execute one or more processes; and
   a memory configured to store a process that is executable by the processor, the process when executed configured to:
   obtain a set of device classification rules, each device classification rule specifying one or more attributes from a set of attributes and being configured to assign a device type to an endpoint in a network when the endpoint exhibits the one or more attributes specified by that rule;

form a graphical representation of the set of attributes by generating a concept lattice based on the set of attributes that represents a plurality of potential device classification rules, wherein the graphical representation of the set of attributes comprises a plurality of nodes and a plurality of edges interconnecting the plurality of nodes, each node representing a particular subset of the set of attributes being exhibited by one or more endpoints in the network, and each edge representing a relationship between two nodes;

perform an analysis of the graphical representation of the set of attributes;

select, based on the analysis of the graphical representation of the set of attributes, a particular device classification rule from among theft plurality of potential device classification rules configured to assign a device type to the one or more endpoints; and provide a result of the analysis to a user interface.

10. The apparatus as in claim 9, wherein the device type is indicative of one or more of: a manufacturer of the endpoint, a model of the endpoint, or a software version associated with the endpoint.

11. The apparatus as in claim 10, wherein the apparatus performs the analysis of the graphical representation of the set of attributes by:

computing relevancy scores for the plurality of potential device classification rules based on their similarities to each of the set of device classification rules; and selecting the particular device classification rule from among the plurality of potential device classification rules based on its relevancy score.

12. The apparatus as in claim 11, wherein the apparatus provides the result of the analysis to the user interface by:

providing the particular device classification rule to the user interface; and receiving feedback regarding the particular device classification rule from the user interface.

13. The apparatus as in claim 9, wherein the apparatus forms the graphical representation of the set of attributes by:

generating a master tree representation of the set of device classification rules.

14. The apparatus as in claim 13, wherein the apparatus performs the analysis of the graphical representation of the set of attributes by:

using the master tree representation to determine metrics comprising at least one of:

measures of conflict among the set of device classification rules, measures of stability of classifications by the device classification rules, or measures of time needed to apply the device classification rules to endpoint devices.

15. The apparatus as in claim 14, wherein the process when executed is further configured to:

optimize at least one of the set of device classification rules based on the metrics.

16. The apparatus as in claim 13, wherein the set of device classification rules are obtained from a plurality of source systems, and wherein the apparatus provides the result of the analysis to the user interface by:

providing a comparison of the plurality of source systems to the user interface.

17. A tangible, non-transitory, computer-readable medium storing program instructions that cause a device to execute a process comprising:

obtaining, by the device, a set of device classification rules, each device classification rule specifying one or more attributes from a set of attributes and being configured to assign a device type to an endpoint in a network when the endpoint exhibits the one or more attributes specified by that rule;

forming, by the device, a graphical representation of the set of attributes by generating a concept lattice based on the set of attributes that represents a plurality of potential device classification rules, wherein the graphical representation of the set of attributes comprises a plurality of nodes and a plurality of edges interconnecting the plurality of nodes, each node representing a particular subset of the set of attributes being exhibited by one or more endpoints in the network, and each edge representing a relationship between two nodes;

performing, by the device, an analysis of the graphical representation of the set of attributes;

selecting, by the device and based on the analysis of the graphical representation of the set of attributes, a particular device classification rule from among theft plurality of potential device classification rules configured to assign a device type to the one or more endpoints; and providing, by the device, a result of the analysis to a user interface.

18. The computer-readable medium as in claim 17, wherein the device type is indicative of one or more of: a manufacturer of the endpoint, a model of the endpoint, or a software version associated with the endpoint.

* * * * *

UNITED STATES PATENT AND TRADEMARK OFFICE
CERTIFICATE OF CORRECTION

| | |
|---|---|
| PATENT NO. | : 11,971,962 B2 |
| APPLICATION NO. | : 16/860581 |
| DATED | : April 30, 2024 |
| INVENTOR(S) | : David Tedaldi et al. |

It is certified that error appears in the above-identified patent and that said Letters Patent is hereby corrected as shown below:

In the Specification

Column 13, Line 27 please amend as shown:
operate to construct a single representation of the device classify- Column 13, Line 40 please amend as shown:
mation can be provided to rule management service 618

Column 14, Line 22 please amend as shown:
attribute condition, "OUI='Apple, Inc." is identified and a Column 15, Line 6 please amend as shown:
tion, SSE engine 608 may access the MTR generated by RBI Column 16, Line 57 please amend as shown:
hours. A third classification can go as far as distinguishing the different Column 16, Line 59 please amend as shown:
name and maybe even model version number, where rules Column 17, Line 2 please amend as shown:
devices could be easily just classified as IoT sensors.

Column 17, Line 12 please amend as shown:
rule information stored in URD 602 and obtained from the Column 17, Line 57 please amend as shown:
eters and its intent must contain both their OUI and their Signed and Sealed this
Sixteenth Day of July, 2024

Katherine Kelly Vidal
*Director of the United States Patent and Trademark Office*

CERTIFICATE OF CORRECTION (continued)
U.S. Pat. No. 11,971,962 B2

Column 18, Line 2 please amend as shown:
butes: four possible OUI strings and three possible DHCP Column 18, Line 7 please amend as shown:
800 represents the most general concept, also known as the Column 18, Line 20 please amend as shown:
that represents the concept of {OUI=ThermoInc, dhcp_pri=1, Column 18, Line 39 please amend as shown:
finer and use both OUI and dhcp-pri everywhere, which would Column 18, Line 40 please amend as shown:
result in five fine-grained and distinct classes, corresponding Column 18, Line 44 please amend as shown:
By analyzing which extents and intents are subsets and Column 18, Line 45 please amend as shown:
supersets of each other the concepts are linked upward (e.g., Column 20, Line 55 please amend as shown:
(e.g., given that the OUI is "Apple," an optimal rule may be Column 21, Line 60 please amend as shown:
but very distinct DHCP fingerprints. Allowing a label to be Column 25, Line 19 please amend as shown:
classification rule from among the plurality of Column 26, Line 41 please amend as shown:
ticular device classification rule from among the